United States Patent [19]

Vassar

[11] Patent Number: 5,165,014
[45] Date of Patent: Nov. 17, 1992

[54] METHOD AND SYSTEM FOR MATCHING THE SOFTWARE COMMAND LANGUAGE OF A COMPUTER WITH THE PRINTER LANGUAGE OF A PRINTER

[75] Inventor: Robert M. Vassar, Boise, Id.

[73] Assignee: Hewlett-Packard Company, Palo Alto, Calif.

[21] Appl. No.: 580,984

[22] Filed: Sep. 12, 1990

[51] Int. Cl.$^5$ .............................................. G06K 15/00
[52] U.S. Cl. .................................... 395/112; 395/275
[58] Field of Search ............... 395/101, 112, 113, 114, 395/275, 500; 400/62, 76; 358/402, 442, 141, 445, 470

[56] References Cited

U.S. PATENT DOCUMENTS 4,968,159  11/1990  Sasaki et al. ..................... 395/112
4,992,957  2/1991  Aoyama et al. ................... 395/112

OTHER PUBLICATIONS

Patent Abstracts of Japan; vol. 014, No. 113 (M-094) Mar. 2, 1990 and JP, A 1 314 166 (MITA) Dec. 19, 1989.
IBM Technical Disclosure Bulletin, vol. 33 No. 1B, Jun. 1990, New York U.S. pp. 126-130; 'Printer Data Stream Method to Allow Dynamic Stream Switching'.

Primary Examiner—Arthur G. Evans

[57] ABSTRACT

A method and system for matching the software command language of a computer with the printer language of a printer wherein the nature, character and frequency of a stream of data generated from computer software is sensed to determine the particular command language in which the computer is operating. In response to this sensing function and in the detection of the presence or absence of certain preselected ASCII characters within a predetermined number of characters initially scanned, an automatic selection is made between the computer or computer workstation and either one of a plurality of available printers operating in this same language or to a correct language conversion card connection within a single printer. In this manner, manual language matching keycap selection and problems associated therewith at the computer keyboard are eliminated.

2 Claims, 3 Drawing Sheets

METHOD AND SYSTEM FOR MATCHING THE SOFTWARE COMMAND LANGUAGE OF A COMPUTER WITH THE PRINTER LANGUAGE OF A PRINTER

TECHNICAL FIELD

This invention relates generally to computer-to-printer network systems and more particularly to such systems operative to selectively interconnect one or a plurality of personal computers to one or a plurality of printers and based upon the computer and printer language being used.

BACKGROUND ART

In recent years, various printer manufacturers have designed methods for users to access internal features of their printers. Typical of these features are the ability to set margins, specify type fonts, do underlining, print graphics images, set line spacing, and establish a desired page orientation. These features are typically accessed by transmitting certain predefined character sequences to the printer, and taken together these defined character sequences constitute a "printer language" as this term is used herein.

Various printer languages of the type described above have been developed to control the format of the text and graphics output from printers such as electrophotographic or laser printers. In the past, if a user needed only high speed, high efficiency text printing capability, then he or she might prefer to use the printer language well known in the art as the Printer Command Language (PCL) developed by the Hewlett Packard Company of Palo Alto, Calif. to define a standard for printer features and feature access by software applications. Conversely, if a user needed a more graphic oriented output print capability, he or she might at one time have chosen the well known PostScript printer language made available by Adobe Systems Incorporated of Mountain View, Calif. as a device-independent page description language.

In the field of computer-to-printer network systems designed to provide a user with the above printer language selection capability, it has been a common practice to interconnect a plurality of personal computers through a central print serving station, known as a print server, into a plurality of available printers having different printer languages operational therein. Upon receipt of a printer selection signal from a computer and based upon the command language in which the computer software operates, the print server is operative to match and connect the printer and computer so that they operate in the same printer and computer command language.

As an example, some of the above plurality of personal computers may be operational on software such as the well known MicroSoft Word (MS Word) software developed by MicroSoft Incorporated of Richland, Wash. Computers operating with MS Word software may, for example, be operated in the above well known PostScript command language to thereby cause the printers to which they are connected to generate text and graphics in the well known PostScript text and graphics format. Thus, it is essential that the print server operate to interconnect these personal computers operating on MS Word software to corresponding printers which are also operating in the PostScript printer language. Examples of personal computers which operate on the PostScript command language are those provided by Apple Computer, Inc. and International Business Machines.

Conversely, a computer user operating his or her computer with WordPerfect operating with the well known Printer Command Language or PCL language developed by the Hewlett Packard Company needs to have this computer connected and matched to a printer operating in this same PCL language. In this case, it may be preferable for the print server to interconnect these latter computers to one of the Hewlett Packard LaserJet Series of electrophotographic printers which operate in response to this well known PCL printer command language.

The above software command and printer language matching requirement is also present in the situation where a single personal computer is operable with different types of software having different command languages and is connected by multiple wires to a single printer. In this application and connection, the single printer is usually operative with the use of one or more command language conversion cards in order to function in more than one printer control language. Data in one command language received from a computer is converted in these language conversion cards to a different printer language before being applied to the laser scan electronics in the operation of the connected electrophotographic printer.

However, in either of the above types of network systems, the personal computer user is currently required to make a necessary keyboard (keycap) or other equivalent selection in order to ensure that the correct electrical connections are made between the personal computer to either a desired printer or to a correct command language conversion card terminal within a single printer to properly match the command language of the personal computer software to a printer operating with that same corresponding printer language.

The obvious disadvantage with the above requirement for proper keycap selection not only involves an additional computer keyboard operation for the user, but a failure to execute this proper and necessary keyboard operation means that the improperly selected printer or command language conversion card will be totally inoperative when connected to the incorrect and improperly connected computer command language.

DISCLOSURE OF INVENTION

The general purpose and principal object of the present invention is to totally eliminate the above keyboard and keycap printer language selection requirement in order to properly interconnect a computer with a language-matched printer or language conversion card therein.

To eliminate this requirement, there has been developed and reduced to practice a new and improved method and system of the type described for matching the software command language of a computer with the printer language of a printer. This matching operation is accomplished in such a manner that the computer has automatic selection means provided therein for making the above printer language selection automatically. This automatic selection is accomplished by sensing the nature and character of data output from the computer software and responding thereto to provide the correct computer-to-printer switching action necessary to in turn provide the correct printer connection or language conversion card connection. In this manner, special keyboard and keycap selection to provide this computer-to-printer matching function is not required.

More specifically, to accomplish the above purpose and object, and in the development of many related novel features of this invention, the method and system described herein has been organized and constructed to use the steps of:

a. reading a stream of data generated from software of a computer, b. detecting the presence of one or more predetermined characters in the data stream and occurring within a predetermined period of time and indicative of a single particular printer language, and thereby c. automatically matching the output connection between the proper output terminal of the computer and a proper input terminal of either a single printer or a selected one of an available number of printers.

Broadly stated, the novel system according to the present invention includes:

a. means for reading a stream of data generated from software of a computer, b. means connected to the reading means for detecting the presence of one or more predetermined characters in the data stream and occurring within a predetermined period of time and indicative of a single particular printer command language, and c. means connected to the detecting means for automatically selecting and matching the output connection between a proper output terminal of the computer and the proper input terminal of either a single printer or one of an available number of different printers.

In accordance with a more specific embodiment and novel feature of this invention, the above reading means includes a plurality of parallel-connected character counters, and the detecting means includes a comparator connected to receive output character-byte data from these counters. The comparator is operative to tell if enough character data has been received in order to make a command language determinator. A language determinator defines the above automatic selecting and matching means and is responsive to output character data from the comparator for making a command language determination based upon the nature and frequency or sequence of certain language-specific character bytes received within a larger group of character bytes scanned.

The above brief summary of the invention, and other objects, features, and related advantages thereof will become more readily apparent in the following description of the accompanying drawings.

DETAILED DESCRIPTION OF THE PREFERRED EMBODIMENT

Figure 1:
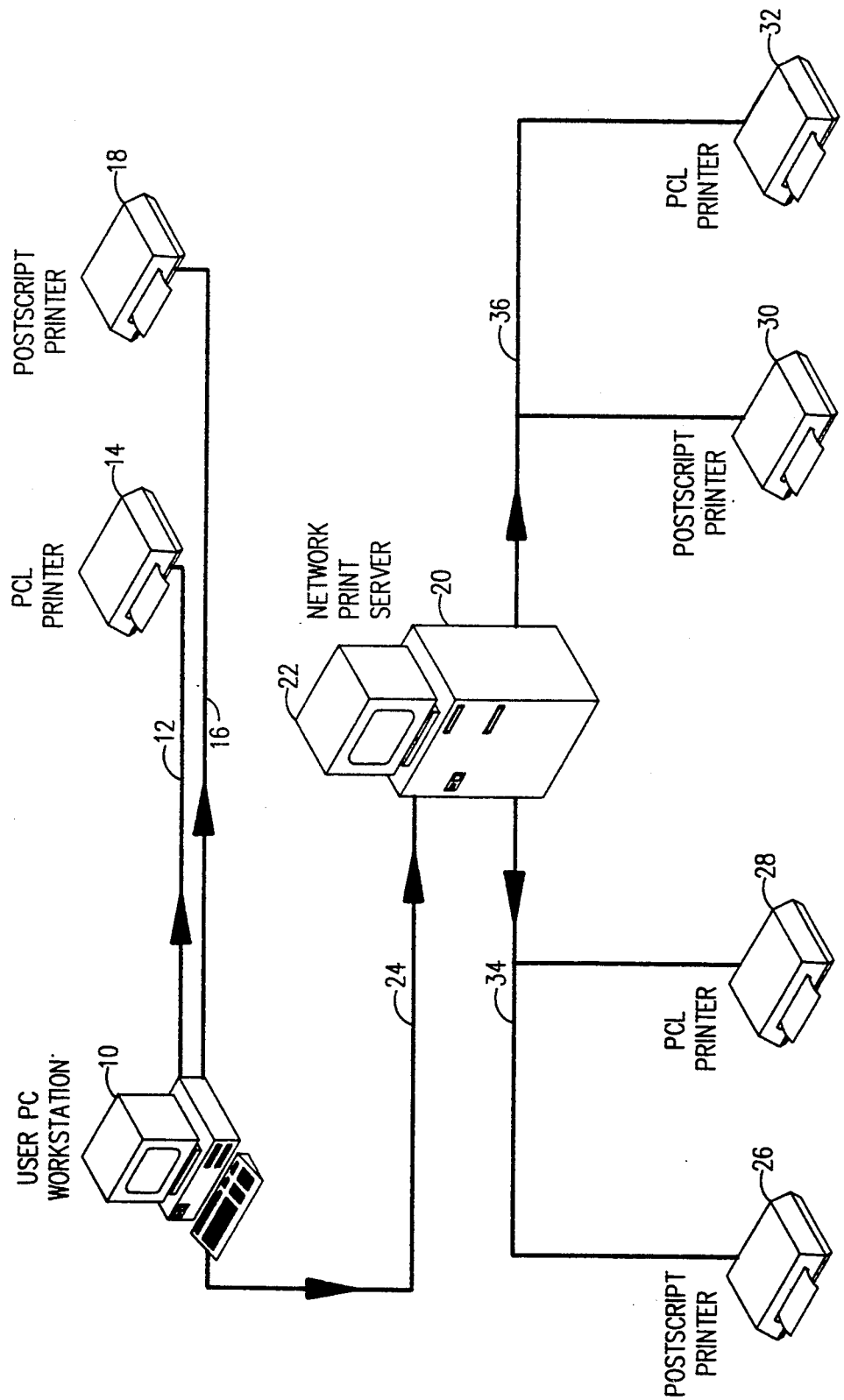
FIG. 1 is a functional block diagram of a personal computer-to-printer network system in which the present invention will be most useful and wherein a user personal computer (PC) workstation is shown connected both directly to different types of printers and also through a network print server to a plurality of different types of printers.

Referring now to FIG. 1, there is shown a user personal computer (PC) workstation 10 which is connected directly by way of one output connection 12 to a PCL printer 14 and which is further connected by way of another output connection 16 directly to a PostScript printer 18. As previously described, these directly connected PCL and PostScript printers 14 and 18, respectively, may be provided with language conversion cards therein which must be properly connected at the printer-to-computer or workstation interface if the software of the PC workstation 10 is operating with a different command language from the command language of the PCL and PostScript printers 14 and 18.

The system shown in FIG. 1 further includes a network print serving station 20 including a display screen 22, and the network print serving station or "print server" 20 is connected to the PC workstation 10 by way of another connection or cable 24. The network print server 20 is operative as described above to properly match and interconnect via lines 34 and 36 an available PostScript or PCL printer, such as one of the plurality of available printers 26, 28, 30, and 32, to the personal computer or workstation 10. Thus, as previously indicated, the computer and printing network system shown in FIG. 1 is operative for connecting either diverse types of printers such as printers 14 and 18 having language command conversion cards therein directly to the PC workstation 10, or alternatively is operative to connect the PC workstation 10 through a print server or print serving network 20 and by way of the interconnect lines or cables 34 and 36 to an available one of a group or plurality of diverse type command language printers 26, 28, 30, and 32.

Figure 2:
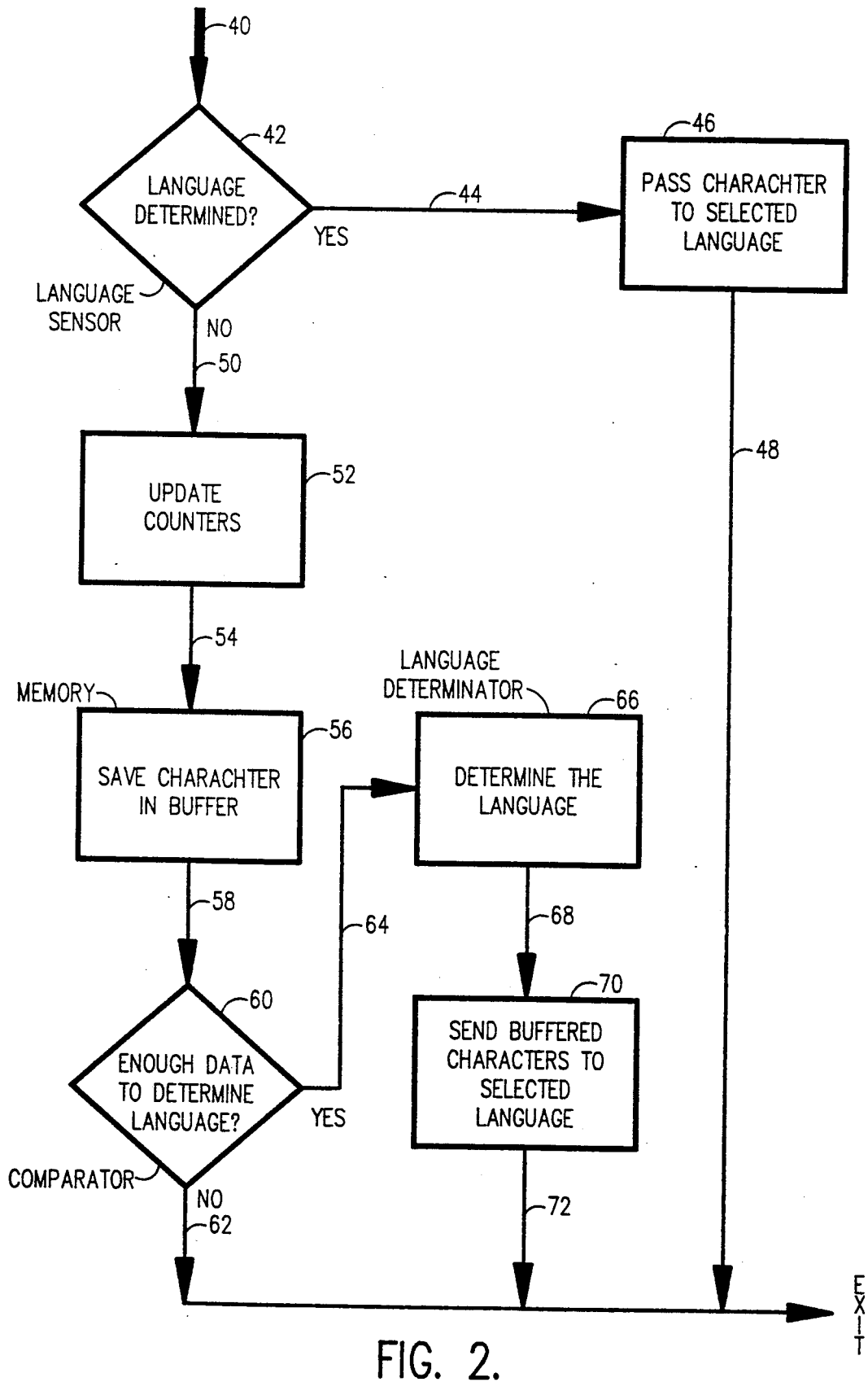
FIG. 2 is a functional block diagram showing the data processing methodology and accompanying sub-system utilized by the system in FIG. 1 to determine the particular type of command language in which the software of the PC workstation in FIG. 1 is operating.

Referring now to FIG. 2, the following description explains how either of the above network and command language matching connections may be made in a novel manner. A character or byte input signal is applied through an input line 40 to a language sensor and control stage 42 which is operative to look for a signal which indicates whether or not the printer command language has already been determined. If the PCL or PostScript or other chosen command language has already been determined, then an output "YES" signal will be generated on line 44 and this "YES" or determined command language signal will be applied to the command language selection stage 46 which operates to properly connect a chosen PCL or PostScript printer to the command language data on line 48. In an ideal world, each particular and unique printer command language could conceivably provide its incoming data stream with an initial one or two characters in the data stream which are uniquely representative of only one particular command language. If such were the case, then the language sensor and control stage 42 would then always generate a language selection or "YES" signal on line 44 to be passed to the language selection stage 46. The language selection stage 46 is in turn is operative to match the proper command language of one of the printers in FIG. 1 with the unique command language of the data received on line 40 and determined by the software operating within the user PC workstation 10 shown in FIG. 1.

However, as will be appreciated and understood by those skilled in the art, the many software makers to whom various printer and computer command languages are recommended and made available have not traditionally followed standardized and recommended character patterns for initial use in a data stream in order to signify as soon as possible the software command language operational in the computer. Instead, the various software makers have traditionally used many different character patterns and sequences within a first predetermined larger number of characters in a data stream which thereby uniquely form part of each individual software maker's command language. For example, instead of the users of PCL software command language always having to look for one or two unique initial language-identifying characters of the same type and the users of PostScript software command language also always having to look for one or two unique initial language-identifying characters in a data stream of a different type, the various software users instead have been required to examine a large amount of incoming character data within a predetermined larger number of characters initially scanned. Then and only then have the software users been able to: (1) determine the proper command language in which the personal computer or workstation is operating, and (2) then properly connect the correct and matching computer or workstation output terminal to the correct printer (or language conversion card) input terminal. It is the elimination of this latter requirement and problems associated therewith to which the present invention is directed.

Examples of this characteristic usage of different types, sequence and frequency of certain data characters within a particular command language are given below and with reference to the data processing methodology and system shown in FIG. 2. The examples given hereinbelow are for the well known PostScript and Printer Command Language (PCL) identified above, and the particular characters searched for in these examples and the frequency and sequence of their occurrences are based upon known and observed byte patterns which are unique and peculiar only to these two printer and software command languages. However, it will be understood and appreciated by those skilled in the art that these exemplary command languages are in no way limiting on the scope of the appended claims, and that the method and system described herein may be used to discriminate between other and different computer software and printer command languages.

If the input data and control information now present on line 40 or previously present on line 40 as part of the current print job is insufficient to allow the print language controller within the language sensor 42 to determine the printer command language in which the computer software is operating, then an output or "NO" signal will be generated on line 50. This "NO" signal will be generated within the language sensor stage 42 and applied as an input signal to activate all of a plurality of update counters within a character counting stage 52. The counter stage 52 may include any required number of individual character or byte counters which are operative for counting the occurrence within the data stream on line 50 of certain preselected characters which are searched for in the present command language determination process. However, in the example given below for determining whether the printer command language is either PostScript or PCL, and in the accompanying functional system block diagram shown in FIG. 3 for carrying out this example, only four individual counters are used as update counters in the stage 52.

The output data from the update counter stage 52 is applied by way of its output line 54 into a buffer memory stage 56 and stored therein until such time that it is desired to determine the printer command language. At this time, an output signal is generated on line 58 and applied to a comparator stage 60 which functions to read the data on line 58 and to compare the data received with certain preselected language-indicative characters within a predetermined larger number of initial characters scanned to first determine if enough data has been received to determine the software command language in which the computer or workstation 10 is operating. If there is not enough data yet received into the comparator stage 60 to make this language determination, then a "NO" signal is generated on the output line 62 as indicated. If, however, the comparator stage 60 has read enough data allow a language determination to be made, then a "YES" signal is generated as indicated on line 64 and is applied as the input control signal to a language determinator stage 66. This language determinator stage 66 makes the correct language determination and in turn generates a corresponding language determination output signal on its output data line 68. The output signal on data line 68 is in turn applied as an input signal to a command language selector stage 70 which is operative to automatically interconnect the correct printer or workstation output terminal with the correct printer or plotter input terminal to match the operating command languages of the two.

Figure 3:
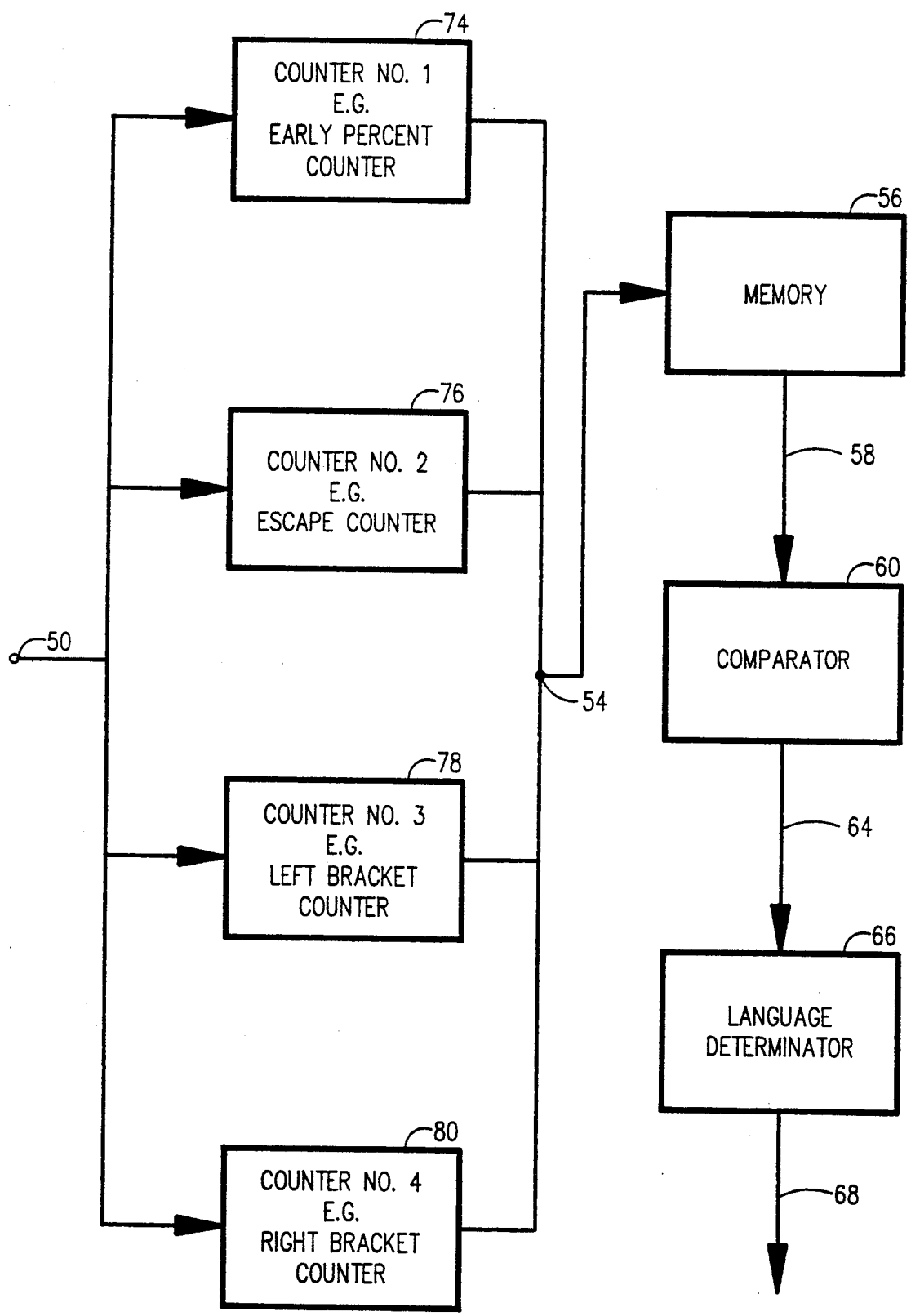
FIG. 3 is a functional block diagram of a sub-system of FIG. 2 and showing a typical connection of a plurality of different types of character counters useful in FIG. 2. These counters may be used either alone or in combination to generate an output signal determinative of the command language in which the personal computer workstation in FIG. 1 is operating.

Referring now to FIG. 3, the character counting system shown in the functional block diagram of this figure is operative in the printer command language determination process and operation described above. The counting system shown in FIG. 3 is used herein to illustrate by way of example only how a command language determination is made as to whether the character data stream on line 40 in FIG. 2 is either the PostScript command language or the PCL command language. The various characters of data referred to in the example given below are those defined by the well known American Standard Committee for Information Interchange (ASCII), and these characters are well known to those skilled in the art.

The input data on line 50 from the input language sensing and control stage 42 is applied simultaneously to the four (4) counters 74, 76, 78, and 80 as indicated. The counter number 1, or counter 74, is an Early Percent counter whereas the counter number 2 is an Escape counter 76. The counter number 3 in the example given is a Left Bracket counter 78, and the counter number 4 or counter 80 is a Right Bracket counter. The percent sign (%), the Escape signal (not visible) and the Left and Right Bracket characters ({ and }) are all characters within the 256 bytes of the ASCII list of standard characters.

For example, the first thirty-two (32) characters in this list are control characters which are never printed, but rather are only used to provide various computer and printer control functions. Character number 27 in this list of the first thirty-two characters of the 256 ASCII character grouping is a well known "Escape"

character long having a function and control purpose going back to the early days of the teletype machine. The list of characters following the first thirty-two characters are known punctuation signs, whereas the list of characters following the listing of punctuation signs are the alphabet letters A through Z, both capital and lower case, and so on. Therefore, the various characters referred to in the example given below with reference to FIG. 3 are all within the list of the 256 ASCII characters which are well known in the art.

If the first two characters in the data stream on line 50 are a combination of a Control-D or (Ctrl-D) followed by a percent sign "%", then a count value of 5 is added to the Early Percent counter 74. If there appears a double percent sign, or a "%%" sign, within the first one-hundred bytes on file and received on line 50, then a count value of 2 is added to the Early Percent counter 74, and if a single percent sign, or "%", appears on data line 50 within the first one-hundred bytes received on line 50, a count value of 1 is added to the Early Percent counter 74.

If the Escape character number 27 appears on line 50, a count value of 1 is added to the Escape counter 76. If a Left Bracket sign or "{" appears on line 50, then a count value of 1 is added to the Left Bracket counter 78. If a Right Bracket sign or "}" appears on line 50, then a count value of 1 is added to the Right Bracket counter 80. All of the latter three characters must appear within the first one thousand (1000) bytes on file and also read by the comparator 60. The above output data from the update counters 74, 76, 78 and 80 appears on line 54 and is stored in the buffer memory stage 56 as indicated and is subsequently applied via line 58 to the comparator stage 60. When the first one-thousand (1000) characters of the data stream on line 50 have been scanned and the following additional conditions are present in the comparator stage 60, then a "YES" signal will be generated on line 64 as an input signal to the language determinator stage 66. This "YES" signal is an indication signal to the language determinator stage 66 that enough data has been received by the comparator stage 60 to allow a command language determination to be made.

If one thousand (1000) characters have now been received by the comparator stage 60, the comparator stage 60 is operative and now ready to determine from the received data if any one of the following data-sufficient conditions exist. If the Early Percent counter 74 has a count value greater than 5, or if the Escape counter 76 has a count value of greater than 50, or if the Right Bracket counter 80 value is also greater than 50, and one thousand (1000) characters have been received by the comparator stage 60, then the comparator stage 60 will generate a "YES" output signal on line 64 which is applied to the language determinator stage 66 as shown.

The language determinator stage 66 is now operative to determine the particular command language received when the first of the following seven (7) conditions is satisfied. If one thousand (1000) characters have been scanned and the Escape counter 76, the Left Bracket counter 78, and the Early Percent counter 74 are all zero, then the command language must be PCL and a corresponding PCL output signal is generated on line 68. If, however, one thousand (1000) initial characters have been scanned and the Escape counter 76 is zero and the Early Percent counter 74 has a count value of greater than 4, then the command language must be PostScript, and a corresponding PostScript output signal is generated on line 68 from the language determinator stage 66.

If one thousand (1000) characters have been scanned and the Escape counter 76 has a count value of greater than or equal to one half of the count value of the Left Bracket counter 78, then the command language must be PCL and a corresponding PCL indication output signal is generated on line 68. Also, if one thousand (1000) characters have been scanned and the Right Bracket counter 80 has a count value of less than 5, then again the command language must be PCL, and the language determinator stage 66 will so indicate by the generation of an appropriate PCL output signal on line 68.

If one thousand (1000) characters have been scanned and the Left Bracket counter 78 has a count value equal to the count value of the Right Bracket counter 80, then the command language must be PostScript, and the language determinator stage 66 will so indicate by generating a PostScript output signal on line 68. If, however, after the scanning of one thousand (1000) characters the Left Bracket counter 78 and the Right Bracket counter 80 have a total count value of greater than 30 between them, and additionally the difference in count value between the Left Bracket counter 78 and the Right Bracket counter 80 is less than a count value of 10, then the command language again must be PostScript and the language determinator stage 66 will so indicate by generating a PostScript output signal on line 68.

Finally, if none of the above six (6) conditions in this example exist after the scanning of one thousand (1000) characters, then the command language must be PCL and the language determinator stage 66 will again so indicate and generate a corresponding output PCL command language selection signal on line 68.

Various modifications may be made in and to the above described embodiment and command language determination examples without departing from the spirit and scope of this invention. For example, specific characters and character patterns and frequencies other than those described above, but still unique to a particular command language, may be searched instead of those given in the specific examples above. In addition, other data processing methodologies and data processing systems corresponding thereto may be used instead of, or in addition to, those specifically shown in FIGS. 2 and 3 herein. Accordingly, these and other obvious hardware and software design modifications are clearly within the scope of the following appended system and method claims.

I claim:

1. A method for determining a command language in which a computer or computer workstation is operating which comprises the steps of:
   a. scanning a predetermined number of characters in the data stream from said computer and within a group of printable non-command characters,
   b. counting the existence in said data stream of the presence of a plurality of individually selected printable non-command characters to generate a plurality of count output values only after a larger predetermined number of characters have been scanned,
   c. adding certain ones of said count output values to establish a plurality of numeric conditions, some of which are indicative of a first printer command language and some of which are indicative of a second printer command language, and d. comparing said plurality of numeric conditions in sequence to a corresponding plurality of reference values to thereby generate output data representative of either said first printer command language or said second printer command language.

2. A system for determining a command language in which a computer or computer workstation is operating including, in combination:

a. means for scanning a predetermined number of characters in a data stream received from said computer and within a group of printable non-command characters, b. means connected to said scanning means for counting the existence in said data stream of the presence of a plurality of individually select characters to generate a plurality of count output values only after a larger predetermined number of characters have been scanned, c. means connected to said counting means for adding certain count output values to establish a plurality of numeric conditions, some of which are indicative of a first printer command language and some of which are indicative of a second printer command language, and d. means connected to said adding means for comparing said plurality of numeric conditions in sequence to a corresponding plurality of reference values to generate output data representative of either said first printer command language or said second printer command language.

* * * * *